United States Patent [19]

Schubert

[11] Patent Number: 4,750,618
[45] Date of Patent: Jun. 14, 1988

[54] ARRANGEMENT FOR SECURING OF RECORDING DISK, IN PARTICULAR COMPACT DISK PLATE, AGAINST UNAUTHORIZED TAKING

[75] Inventor: Otto Schubert, Vienna, Austria

[73] Assignee: Lift Verkaufsgerate-Gesellschaft m.b.H., Vienna, Austria

[21] Appl. No.: 865,880

[22] Filed: May 21, 1986

[30] Foreign Application Priority Data

Sep. 24, 1984 [AT] Austria .................................. 3029/84

[51] Int. Cl.[4] ............................................. B65D 85/57
[52] U.S. Cl. ..................................... 206/309; 206/310; 206/1.5; 206/459; 206/807
[58] Field of Search ............... 206/309, 310, 493, 480, 206/482, 1.5, 459, 444, 807; 24/336, 339, 563

[56] References Cited

U.S. PATENT DOCUMENTS

| 3,582,169 | 6/1971 | Koenig | 312/20 |
|---|---|---|---|
| 3,858,280 | 1/1975 | Marters | 24/150 R |
| 4,075,618 | 2/1978 | Montean | 340/280 |
| 4,084,690 | 4/1978 | Pulse | 206/1.5 |
| 4,122,945 | 10/1978 | Borzak | 206/493 |
| 4,254,879 | 3/1981 | Maule | 211/4 |
| 4,264,169 | 4/1981 | Harvey | 206/450 |
| 4,425,999 | 1/1984 | MacDonald et al. | 206/1.5 |
| 4,540,386 | 9/1985 | Kämpf | 464/130 |

FOREIGN PATENT DOCUMENTS

| 76222 | 12/1947 | Czechoslovakia | 24/563 |
|---|---|---|---|
| 1591860 | 10/1985 | European Pat. Off. | 206/309 |
| 2321584 | 5/1974 | Fed. Rep. of Germany . | |
| 2539035 | 3/1977 | Fed. Rep. of Germany . | |
| 2918783 | 11/1980 | Fed. Rep. of Germany . | |
| 3018107 | 11/1981 | Fed. Rep. of Germany | 206/459 |
| 3425579 | 1/1986 | Fed. Rep. of Germany | 206/387 |
| 8402422 | 6/1984 | PCT Int'l Appl. . | |
| 482258 | 1/1970 | Switzerland . | |
| 929994 | 2/1964 | United Kingdom | 24/336 |

*Primary Examiner*—William Price
*Attorney, Agent, or Firm*—Abelman Frayne Rezac & Schwab

[57] ABSTRACT

A locking device is provided to prevent pilferage of a compact disc from within a storage cassette, the locking device including a locking plate which is positionable over the disc and which is locked to a circular array of spring fingers of the cassette providing a support for the compact disc.

13 Claims, 3 Drawing Sheets

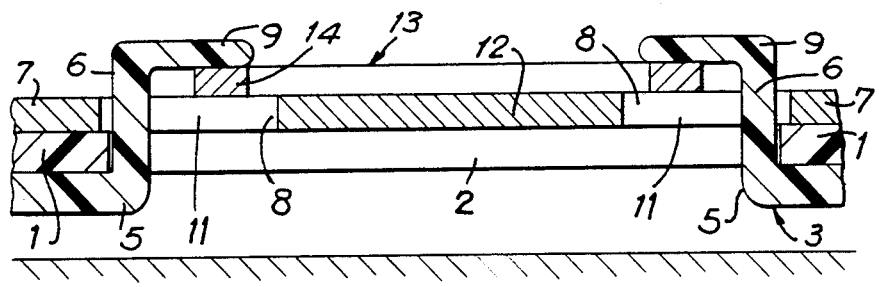
FIG. 2
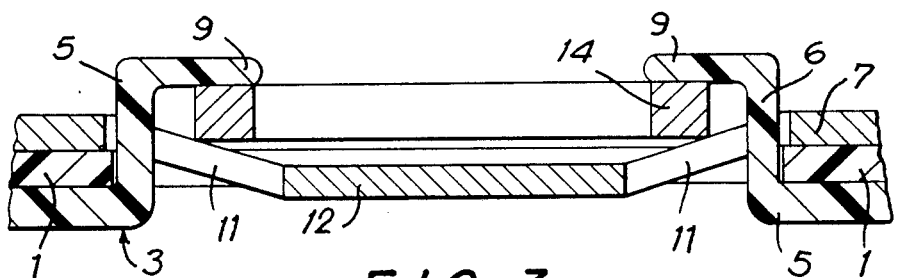
FIG. 3
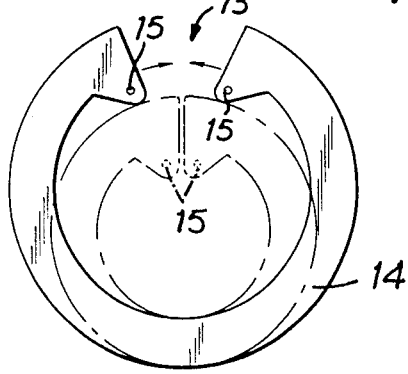
FIG. 4
FIG. 5
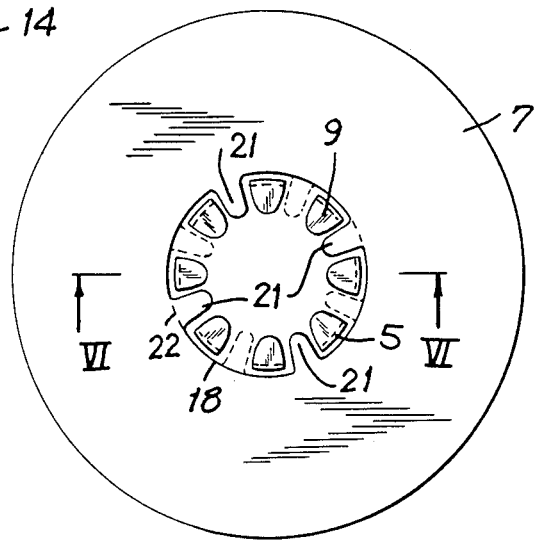

ARRANGEMENT FOR SECURING OF RECORDING DISK, IN PARTICULAR COMPACT DISK PLATE, AGAINST UNAUTHORIZED TAKING

FIELD OF THE INVENTION

The invention relates to a device for securing a recorded compact disc against unauthorized removal from a cassette providing support for the recorded disc.

BACKGROUND OF THE INVENTION

It is known to protect articles against theft by providing a detector in an area of a store which is actuated by an electronic signal circuit or a magnetic strip (compare U.S. Pat. No. 4,075,618) attached to the article. Such saftey arrangements are well-known for protecting clothing against theft, in which a tag is attached to the clothing with the aid of a clamp-like holder or with the aid of a spike. This tag or holder can only be removed with the aid of a special tool available to the sales personnel (compare for example German Patent Application laid open No. 2,539,035 and German Patent Application laid open No. 2,321,584). If, therefore, an article of clothing is carried out of the store without the tag or holder having been removed, then, the detector is actuated and emits an alarm signal.

On the other hand, the protection from theft of optically readable recorded discs, such as easily pocketed compact discs, presents a substantial problem.

Various proposals have been made for the protection against theft of such recorded disks. It is usual to store a compact disk in lockable display cases or presentation stands, or, alternatively, to display empty cassettes, the compact disk being stored in drawers located in the region of the cash register. These solutions entail a considerable expenditure with respect to organization and furnishings. In addition, these solutions are unsatisfactory, since it is not possible to open a cassette and to read an information sheet contained therein if the compact disks are locked in display cases or stands.

It is unfeasible to apply the above mentioned tags or holders to cassettes for compact disks since the cassettes can not be then be opened. If on the other hand a tag is applied to the cassette in a way similar to the way described in the U.S. Pat. No. 4,075,618, then, the cassette can still be opened and the compact disk taken out of the cassette, and, the empty cassette replaced. In this case theft would not be indicated by the store detector.

SUMMARY OF THE INVENTION

It is an object of the present invention to provide means for securing a compact disk or the like against theft, but which permits opening of the cassette containing the compact disk without hinderance.

The securing arrangement is provided by a locking plate which is placed above the compact disk on the circular array of support tongues of the cassette and is locked in that position.

The locking plate includes or covers an anti-theft signal circuit.

This locking plate is constructed such that it cannot be released from the support tongues without the use of a special tool. Preferably the tool is available only to the sales personnel, who can remove the locking plate at the point of purchase.

Unauthorized removal of the compact disk, at least within a short time period, is not possible in a practical situation. On the other hand, the locking arrangement permits the cassette to be displayed for sale in a condition in which it can be opened without impediment to permit study of the contained information sheet. Furthermore, it is self-defeating to take the support including the cover plate from the cassette, since the support and the cover plate are united as an unseparable unit, and, upon being removed from the store immediately would activate the anti-theft detector.

The locking member can be separated from the cover plate, or, alternatively, it can be integral with the cover plate, such, for example, as a small key operated lock.

DESCRIPTION OF THE DRAWINGS

Preferred embodiments of the invention are shown in the accompanying drawings, in which:

FIG. 2 is an enlarged cross-section taken on the line II—II of FIG. 1;

FIG. 3 is a cross-section similar to that of FIG. 2, showing a modified locking arrangement;

FIG. 4 is a plan view of a locking spring ring employed in the embodiments of FIGS. 1 to 3;

FIG. 5 is a plan view similar to that of FIG. 1 showing an alternative form of the cover plate, the locking member having been omitted for the sake of clarity;

DESCRIPTION OF THE PREFERRED EMBODIMENTS

Figure 1:
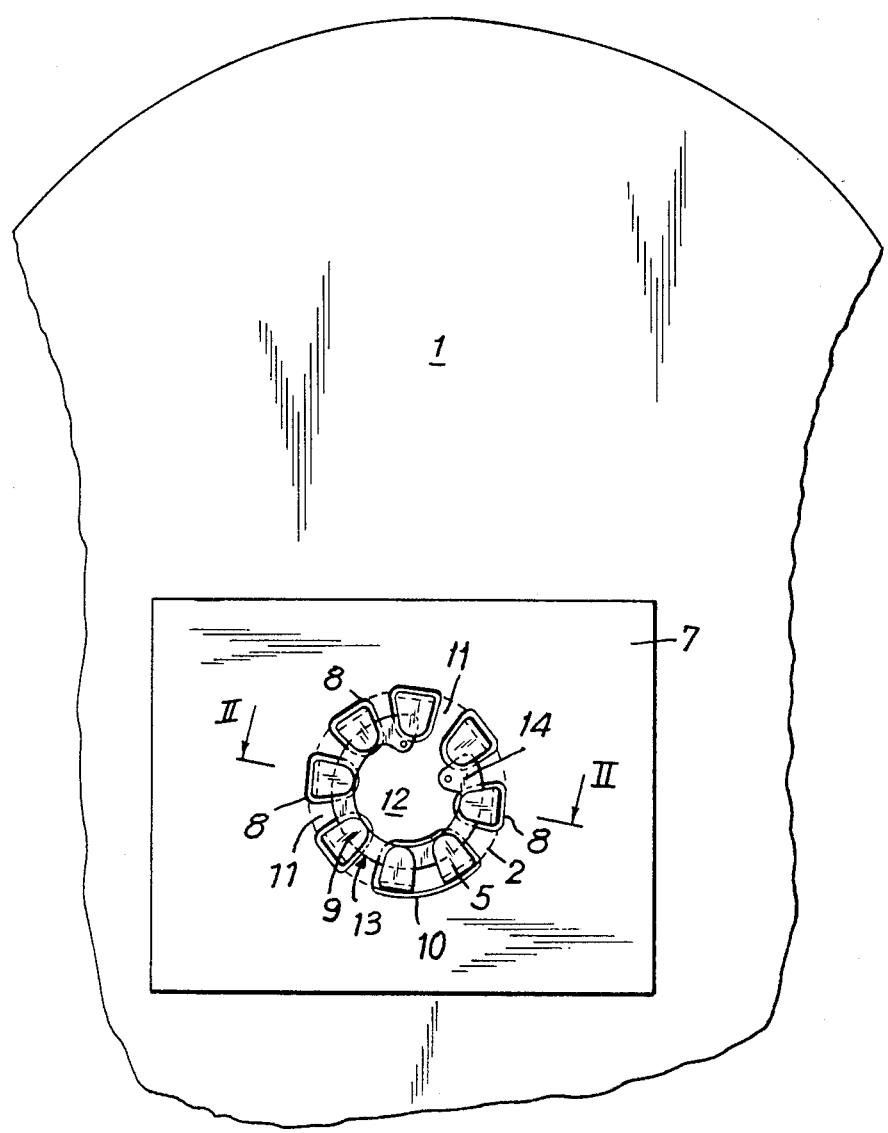
FIG. 1 is a plan view of part of a compact disk showing one preferred embodiment of the locking means.

Part of a compact disk 1 is illustrated in FIGS. 1 and 2. The compact disk has a center circular opening and is supported in a conventional way on an insert 3 of a cassette. The bottom of the cassette is indicated at 4 in FIG. 2. The insert 3 provides eight support tongues 5 arranged in a circular array of spring fingers. The support tongues 5 each include an upwardly and slightly outwardly inclined vertical portion 6, which engages under pressure with the edge of the central opening in the compact disk 1. This way the compact disk 1 is frictionally held by the holder support 3.

A cover plate 7 is placed over the compact disk plate 1, and over the support tongues 5. The cover plate 7 can carry a conventional anti-theft signal circuit which is not illustrated.

The signal circuit preferably is positioned on the bottom side of the cover plate 7 for it to be concealed from view.

In order to be able to place the cover plate 7 onto the holder support 3, the cover plate is provided with openings 8, which are disposed in a circle and each have a shape corresponding to the shape of the upper ends 9 of the support tongues 5. As many openings 8 can be provided as there are support tongues 5. According to the example illustrated, there are eight openings. Two or more such openings can be interconnected into a single opening, as is illustrated in FIGS. 1 at 10. It is, however, essential that at least one web 11 remains, and which extends radially inwardly between adjacent vertical portions 6 of the support tongues 5. It is preferred for reasons of stability to leave a web 11 between all pairs of support tongues 5, such that eight webs 11 connect with a center region 12 of the cover plate 7.

These webs 11 are essential for the locking function since the locking member 13 reacts between the respective webs 11 and the upper ends 9 of the respective support tongues 5. The center region 12 of the cover plate is not of such importance in this context and the center region 12 could therefore be eliminated, as is shown in the embodiment according to FIG. 5.

The locking member 13 comprises, according to the embodiment of FIGS. 1 and 2, a Seeger split spring ring 14, which engages between the upper end 9 of the respective support tongues 5 and the webs 11 of the cover plate 7, in order to lock the cover plate 7 to the support tongues 5.

The spring ring 14 is illustrated in a plan view in FIG. 4. Holes 15 are provided at the ends of the split spring ring 14, in which pins of a pliers-like tool can be inserted to contract the ring 14 against its spring force and into a released position as shown in dotted lines in FIG. 4. The ring 14 is inserted into the opening between the support tongues 5 or, alternatively is removed therefrom by means of the pliers.

Without such tool, the spring ring 14 can only be removed with considerable difficulty from its locking position as shown in FIGS. 1 and 2.

The cover plate 7 cannot be removed from the cassette insert 3, and also the compact disk cannot be removed from the cassette insert 3, until such time as the locking ring 14 has been removed. However, the cassette still can be opened to enable reading of an inserted information sheet.

FIG. 3 illustrates a modification of the embodiment shown in FIG. 2. In this embodiment, the central region 12 of the cover plate 7 is offset in order to provide more space for the reception of the spring ring 14. For this purpose, the webs 11 are inclined downwardly towards the center region 12, which is thus positioned lower than the plane of the cover plate 7. In this way, the spring ring 14 can be made thicker in the axial direction than in the embodiment of FIG. 2. Also, the ring 14 can be made trapezoidal cross section instead of the rectangular cross section shown in FIG. 3 in order to provide an even better adaptation to the downwardly inclined webs 11 of the cover plate 7.

An alternative form of cover plate 7 is shown in the plan view of FIG. 5, which is circular in contrast to the rectangular cover plate of FIG. 1.

In FIG. 5, four radially inwardly extending tangs 21 protrude between the support tongues 5 and into the inner opening. These tangs 21 are disposed in diametrically opposite pairs. Instead of the four tangs, eight such tangs can be provided or alternatively only two such tangs.

The center region 12 of the cover plate 7 is thus eliminated in the embodiment according to FIG. 5. The cover plate 7 of FIG. 5 is secured with the aid of a spring ring, such as the spring ring 14 as shown in FIG. 4. However, other securing members 13 can be employed as will now be discussed with reference to FIG. 6.

Figure 6:
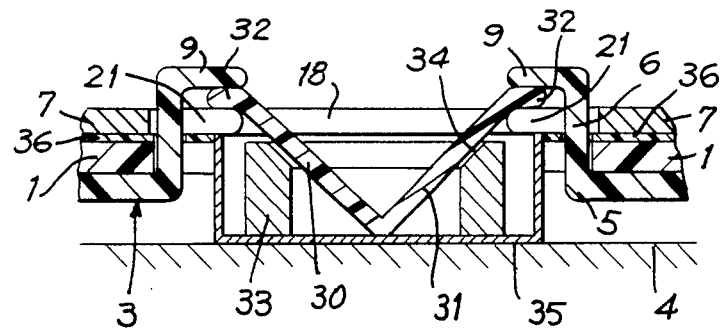
FIG. 6 is a cross-sectional representation similar to that of FIGS. 2, or 3 of an alternative embodiment of the locking arrangement.

In FIG. 6, similar to in FIG. 2, a compact disk is placed onto a cassette insert 3, and a cover plate 7 as shown in FIG. 5 is placed over the compact disk, the cover plate 7 having inwardly directed tangs 21. Preferably, an equal number of such tangs is provided as the number of support tongues 5 that are present at the cassette insert 3.

Figure 7:
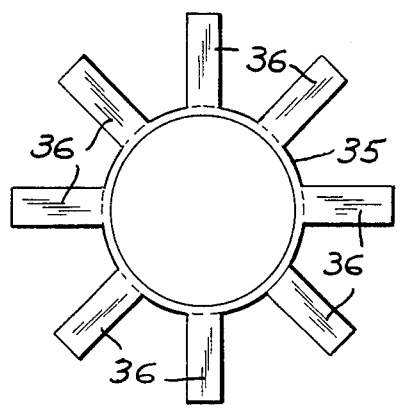
FIG. 7 is a plan view of a cup-shaped shell to be positioned beneath the compact disk in the embodiment of FIG. 6.

The securing member 13 provided for securing or, respectively, bolting of the cover plate 7 at the support 3 comprises according to FIGS. 6 and 7 an elastically deformable locking member having two straddling arms 30, 31 which are connected to each other. The straddling arms 30, 31 are provided at their upper ends with an edge flange 32, and they are connected to each other at their lower ends under a spring tension in a spread position. The edge flanges 32 of the straddling expanding arms 30, 31 protrude in the securing or locking positions shown in FIG. 6 between the upper ends 9 of the support tongues 5 and the tangs 21 of the cover plate 7 in order to hold the cover plate 7 fixed to the cassette insert 3.

In order to release the locking member, the edge flanges 32 of the arms 30, 31 have to be moved in direction toward each other. This can be advantageously achieved with the aid of a ferromagnetic body 33 in the form of a ring which surrounds the two straddling arms 30, 31. The body 33 is inclined at its upper inner side at an inclination corresponding with that of the straddling arms 30, 31 as is illustrated in FIG. 6 at 34 in order to achieve an improved camming action.

The end flanges are formed as circular arcs, and straddling arms 30, 31 have a width and length such that the end flanges 32 engage at least two dimatrically opposed support tongues 5 of the plate 7.

Usually, the cassette insert 3 can be removed from the cassette without a need for special tools. Thus, in this embodiment locking of the cover plate 7 and the compact disk 1 to the support holder 3 could be released from the bottom side of the cassette insert 3. In order to prevent this, a cup-shaped member 35 is provided which covers the bottom side of the locking member 13. This cup-shaped member 35 is made for example of metal and includes at its upper edge several flange-like edge protrusions 36, which extend between the support tongues 5. A plan view of such a member 35 is shown in FIG. 7 where the star-like disposed edge protrusions 36, for example, eight such edge protrusions, can be seen. A smaller number of edge protrusions 36 such as four could be employed. It is only important at this point that the member 35 is locked between the compact disk 1 and the cover plate 7, and that it cannot be removed from the bottom side of the cassette insert 3, if the cassette insert 3 is removed from the cassette.

As can be recognized in the embodiment of FIG. 6, the securing member 13 cannot be removed without the use of auxilary means such as a magnet, but can be removed by sales personnel, quickly and easily.

Figure 8:
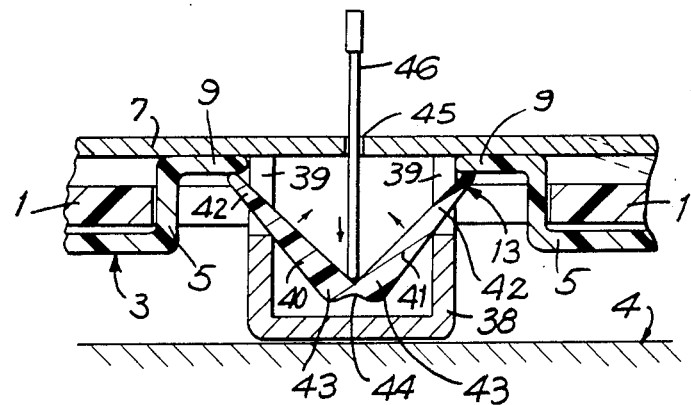
FIG. 8 is a cross-sectional representation similar to that in FIG. 6 of a further embodiment of locking arrangement.

A further preferred embodiment is illustrated schematically in FIG. 8. In FIG. 8, the cover plate provides a continuous cover surface, which cover surface comes to rest above the upper ends 9 of the support tongues 5. A cup-shaped member 38 is provided at the bottom side of the cover plate 7 similar to the member 35 of FIGS. 6 and 7. The member 38 provides openings 39 at two locations disposed oppositely to each other and neighboringly to tongue ends 9. Straddling arms 40 and 41 each have an upper end 42 which protrudes through the respective openings. The straddling arms 40, 41 form a locking member 13 similar to the locking member 13 of FIG. 6. The straddling arms 40, 41 are connected to each other at their lower ends 43 as is indicated in FIG. 8 at 44. This hinge connection can be formed by a film hinge or the like. More generally, the hinge is molded integrally with the arms 40, 41. The hinge connection 44 is such that the straddling arms 40, 41 are pressed radially apart into their spread position.

The upper ends 42 of the straddling arms 40, 41 engage below the upper tongue ends of the two support tongues 5 disposed oppositely to each other. This engaging or snapping in is performed in this case by a simple placing of the cover plate 7 and a downward pressure exerted thereon.

In order to release the locking arrangement and remove the cover plate 7, an annular shaped wedge body similar to that of the embodiment according to FIG. 6 could be provided within the container 38 (This is however not shown). According to FIG. 8, release by a key is provided. For this purpose, an opening corresponding to a key profile is provided in the cover plate 7, and a key with a corresponding profile can be inserted through the opening. The hinge connection 44 of the two straddling arms 40, 41 is thus pressed downwardly by the key, and the two straddling arms are tilted towards each other to release their upper ends from the upper ends 9 of the support tongues 5.

Further modifications and structural changes are possible within the scope of the invention, for example, it is also conceivable to employ a small removable lock fast with the cover plate similar to a lock used in piggy banks for locking of the cover plate to the cassette insert. The lock would be provided with a flap-like or hook-like protrusion to extend under the ends of several adjacent support tongues and which are actuable by a key.

Thus, the present invention advantageously resolves the problem of pilferage of recorded disks such as compact disks without negating access to the cassette, or, to the interior of a cassette. Very simple engagement and locking elements are provided which can only be overcome with difficulty but which can be released by authorized personnel simply and quickly by the use of an appropriate tool, magnet or key.

I claim:

1. An anti-pilferage device for locking a pre-recorded disc within a protective casing, said casing having a circular array of spring fingers to be received within a circular aperture of said disc, said spring fingers resiliently holding said disc against movement relative to said casing, further including
   selected ones of said circular array of spring fingers arranged in circumferentially spaced relation relative to the next adjacent said finger to define a an array of said fingers with slots between selected ones of said fingers, a plurality of said spring fingers terminating in a radially inwardly extending locking tab;
   a locking plate adapted to overlie said prerecorded disc; and
   locking means reacting respectively between said locking plate and said radially extending locking tabs and securing said locking plate and thus said prerecorded disc within said casing in a manner requiring unlocking of said locking means in order to permit removal of said locking plate and prerecorded disc.

2. The device of claim 1, further including said locking plate having a circular aperture dimensioned to receive said circular array of spring fingers, said locking plate having locking tabs extending radially inwardly of the circular aperture therein and sized and positioned for reception in said slots between said spaced spring fingers;
   said locking means being positioned between said radially inwardly extending locking tabs to said spring fingers and said radially inwardly extending locking tabs of said locking plate.

3. The device of claim 2, in which said circular array of spring fingers are symmetrically spaced one from the other, whereby said radially inwardly extending locking tabs of said locking plate are receivable between said fingers in any one of a plurality of angular positions of said locking plate corresponding in number to said slots between said spring fingers.

4. The device of claim 2, in which said radially inwardly extending locking tabs of said locking plate extend radially inwardly of the aperture in said locking plate by a distance greater than the radially innermost extent of said locking tabs of said spring fingers, and said locking tabs of said locking plate are interconnected one with the other at their radially innermost ends.

5. The device of claim 4, in which said locking tabs of said locking plate each extend to one side of the plane of said locking plate.

6. The device of claim 2, in which said locking means is an annular spring having an outside diameter larger than a diameter subtended by the radially innermost portions of said radially inwardly extending tabs of said spring fingers, and which is contractable to an outside diameter smaller than said diameter subtended by the radially innermost portions of said radially inwardly extending tabs of said spring fingers for said annular spring to be withdrawn axially of said circular array of spring fingers.

7. The device of claim 2, in which said locking means is a ring-shaped member formed from a resiliently deformable material, and includes a first ring portion which converges in an axial direction from a free-edge thereof towards an intermediate portion thereof, and a second ring portion integral with said first ring portion and which diverges in an axial direction from said intermediate portion and terminates at its free edge in a radially outwardly extending locking flange positioned between the locking tabs of said resilient fingers and said locking plate, said ring shaped member having axially extending radial slots extending through said second and intermediate portions and which terminate short of said free edge of said first portion, and means for expanding said first portion to produce a radially inward movement of said flange to a diameter smaller than a diameter subtended by the radially innermost portions of said radially inwardly extending tabs of said spring fingers.

8. The device of claim 7 in which said expanding means is a frusto-conical slug of a ferro-magnetic material operative to cause expansion of said first portion of said ring-shaped member under the influence of magnetic attraction exerted on said slug.

9. The device of claim 2, in which said locking means is a strip of a spring material having first and second arm portions oriented in V-shaped formation and which terminate in locking tabs spaced by a distance greater than the diameter subtended by the radially innermost portions of said radially inwardly extending locking tabs of said resilient fingers, and means for decreasing the angle subtended by said first and second arms to reduce the distance between said locking tabs of said locking means to a distance less than the diameter subtended by the radially innermost portions of said radially inwardly extending tabs of said spring fingers.

10. The device of claim 9, in which said means for decreasing the angle subtended by said first and second arms is a ring-shaped member of ferro-magnetic material positioned beneath said strip of spring material and which is movable axially by magnetic attraction, said ring-shaped member providing surfaces for camming said first and second arm portions in a direction to decrease the angle subtended by those arm portions.

11. The device of claim 2, further including a cup-shaped member having radial arms extending from its free edge and which is dimensioned to fit within said circular array of spring fingers with said radial arms of said cup-shaped member extending between adjacent ones of said spring fingers.

12. The device of claim 1, including a cup-shaped member rigidly secured to said locking plate and having a diameter less than the diameter subtended by the radially innermost portions of said radially inwardly extending locking tabs of said resilient fingers, retractable locking members contained within said cup-shaped member and extending radially outwardly thereof and into engagement with said locking tabs of said resilient fingers, and a key-operated mechanism contained within said cup-shaped member and which is operative to cause retraction of said retractable locking members.

13. The device of claim 11, further including electronic alarm circuitry incorporated into said locking plate.

* * * * *